United States Patent
Lilholt (10) Patent No.: US 9,718,207 B2
(45) Date of Patent: Aug. 1, 2017

(54) GUIDANCE ASSEMBLY FOR CIRCULAR SAWS

(71) Applicant: Caspar Lilholt, Central Richmond (CA)

(72) Inventor: Caspar Lilholt, Central Richmond (CA)

( * ) Notice: Subject to any disclaimer, the term of this patent is extended or adjusted under 35 U.S.C. 154(b) by 313 days.

(21) Appl. No.: 14/121,301

(22) Filed: Sep. 15, 2014

(65) Prior Publication Data

US 2016/0075049 A1    Mar. 17, 2016

(51) Int. Cl.
*B27B 9/04* (2006.01)
*B23Q 9/00* (2006.01)
*B27B 11/02* (2006.01)

(52) U.S. Cl.
CPC ............. *B27B 9/04* (2013.01); *B23Q 9/005* (2013.01); *B27B 11/02* (2013.01)

(58) Field of Classification Search
CPC ... Y10T 83/667; Y10T 83/68; Y10T 83/8763; Y10T 83/75; Y10T 83/7507; Y10T 83/7593; Y10T 83/76; Y10T 83/7607; B27B 9/04; B27B 11/02; B27B 11/04; B23Q 9/0014; B23Q 9/0042; B23Q 9/005
USPC .......... 33/415–417, 628, 630, 640, 465, 466, 33/471
See application file for complete search history.

(56) References Cited

U.S. PATENT DOCUMENTS

| | | | | |
|---|---|---|---|---|
| 1,706,115 A | * | 3/1929 | Hannah | B23Q 9/0014 144/136.95 |
| 2,620,835 A | * | 12/1952 | Barnhart | B23Q 9/0085 83/471.3 |
| 2,630,146 A | * | 3/1953 | Van Tuyl | B23Q 9/0085 83/471.3 |
| 2,735,455 A | * | 2/1956 | Forsberg | B23Q 9/005 33/403 |
| 2,823,709 A | * | 2/1958 | Konieczka | B23Q 9/005 33/41.1 |
| 3,130,758 A | * | 4/1964 | McKinley | B23D 45/025 83/486.1 |
| 4,050,340 A | * | 9/1977 | Flanders | B23Q 9/0085 83/522.25 |
| 4,320,678 A | * | 3/1982 | Volk | B23D 49/162 269/87.2 |
| 4,378,716 A | * | 4/1983 | Volk | B23D 49/162 83/438 |

(Continued)

*Primary Examiner* — Stephen Choi
*Assistant Examiner* — Evan MacFarlane
(74) *Attorney, Agent, or Firm* — Frederick Kaufman Inc.

(57) ABSTRACT

A guidance assembly for circular saws includes a monobloc structural unit that incorporates a first, discontinuous annular subassembly and a second, flat inverted at 90 degrees U-shape elongated frame subassembly. A pair of angle beams is spacedly adjustable that is positionally adaptable to support various bases of circular saws. The guidance assembly further includes a fence subassembly, placed beneath the monobloc structural unit, with which is interconnected and cooperates. To prepare the cutting operation, the blade angle of a circular saw is matched to the required angle by rotating first and second subassemblies relatively to fence subassembly. For cutting, a wooden board is placed under first and second subassemblies, so that, laterally, is positioned against a first and a second hollow bars of fence subassembly.

1 Claim, 7 Drawing Sheets

(56) References Cited

U.S. PATENT DOCUMENTS

| | | | |
|---|---|---|---|
| 4,608,898 A * | 9/1986 | Volk | B23Q 9/005 269/1 |
| 4,611,407 A * | 9/1986 | Van Gorp | B23Q 9/005 33/471 |
| 4,660,450 A | 4/1987 | Rafalow | |
| 4,677,750 A | 7/1987 | Maier et al. | |
| 4,840,097 A * | 6/1989 | Campbell | B23Q 9/0085 83/471.3 |
| 4,972,748 A * | 11/1990 | Walsh | B23D 45/024 83/468.3 |
| 5,271,159 A * | 12/1993 | Chen | B23Q 9/005 33/403 |
| 6,991,009 B1 | 1/2006 | Wedeward | |
| 7,610,839 B1 | 11/2009 | Bessette | |
| 8,047,113 B2 * | 11/2011 | Nilsen | B27B 9/04 30/371 |
| 8,573,101 B2 * | 11/2013 | Thomaschewski | B23D 51/025 83/56 |
| 2003/0164078 A1 * | 9/2003 | Hiland, Jr. | B23D 59/001 83/522.11 |
| 2004/0074365 A1 * | 4/2004 | Nilsen | B23Q 9/005 83/745 |
| 2005/0204887 A1 * | 9/2005 | Fries | B23Q 9/005 83/745 |
| 2006/0027289 A1 * | 2/2006 | Lin | B27G 5/023 144/286.1 |
| 2008/0034596 A1 * | 2/2008 | Barnes | B23Q 9/0042 30/373 |
| 2013/0118332 A1 * | 5/2013 | Barnes | B23Q 9/0014 83/745 |
| 2013/0160630 A1 * | 6/2013 | Groth | B23D 45/006 83/743 |
| 2013/0168120 A1 | 7/2013 | DiNicolantonio et al. | |
| 2013/0283993 A1 * | 10/2013 | Holladay | B27B 9/04 83/829 |

\* cited by examiner

SECTION C-C
FIG. 5

GUIDANCE ASSEMBLY FOR CIRCULAR SAWS

CROSS-REFERENCE TO RELATED APPLICATION

This application claims the benefit of priority on the basis of Canadian Patent Application No. 2,859,507 filed on Aug. 14, 2014

I. BACKGROUND OF THE INVENTION

1. Field of the Invention

The invention relates, in general, to devices for guiding power tools with respect to workpieces, and, more specifically, to a guidance assembly for circular saws.

2. Description of the Prior Art

In construction and woodworking fields use is made of portable hand-held power tool, such as circular saws, jigsaws, routers, etc., and/or larger "fixed-bed" power tools. While the hand-held power tools are common due to their portability and low cost, the fixed-bed tools that are more expensive and cumbersome are more preferred due to the precise position of a workpiece with respect to the power tool blade, resulting in a precise cut. However, fixed-bed units require fixed locations and larger working spaces.

Attempts have been made to eliminate or at least to alleviate this the above situation. Thus, for example, U.S. Pat. No. 8,047,113, granted on Nov. 1, 2011 to Nilsen for a "GUIDE FOR HAND-HELD POWER TOOL" discloses a cross-cut apparatus. The latter comprises a guide system including a housing, a guide element mounted on the housing and a linear guide rail mounted on the housing. The apparatus further includes a workpiece coupler defining a desired processing angle and an attachment system, coupled to the housing, for fixing the tool to the guide system. The main disadvantages of this guide reside in the fact that the use is limited to right angle cuts and in the fact that the guide must be mechanically attached to the power tool.

Another example is U.S. Pat. No. 8,573,101, granted on Nov. 5, 2013 to Thomaschewski for a "METHOD AND DEVICE FOR GUIDING A SAW BLADE" describes a device including: a base body having a guide slot, the base body having a first guide surface; and an angle stop comprising a second guide surface. The main shortcomings of the device reside in the fact it requires an additional stabilization, since both hands are on the tool; and that due to the guide arrangement provides a limited versatility.

II. SUMMARY OF THE INVENTION

Based on the state of the art, there is a need for an improved guidance assembly for circular saws that surmounts the existing disadvantages.

Thus, ii is an objective of the present invention to devise a guidance assembly that is precise and reliable.

It is another objective of the present invention to devise a guidance assembly that is portable and easy to use.

Generally stating, the present invention refers to guidance assembly for circular saws, which comprises a monobloc structural unit, which incorporates a first and a second subassembly and is interconnected and cooperates with a fence subassembly, First subassembly comprises a discontinuous annular flat member having a center of symmetry, a first upside face, a second bottom face and terminating laterally and backwards in an upper end and a lower end.

Second subassembly comprises a flat, inverted at 90 degrees U-shape elongated frame, extends frontwards, towards the discontinuous annular flat member, is defined by a horizontal, longitudinal axis of symmetry and includes an upper arm ending in a top end and a lower arm ending in a bottom end. The upper end interpenetrates with the top end and the lower end interpenetrates with the bottom end, thus forming the monobloc structural unit.

Other the fact, that the upper arm, via the top end, basically interconnects with the upper end along their respective widths, a narrow strip, detached from the upper arm, extends beneath it, horizontally and forwards into an interior of the discontinuous annular flat member.

The center of symmetry of the discontinuous annular flat member is so displaced vertically and downwards with respect to the horizontal, longitudinal axis of symmetry, that a positional eccentricity is created.

The lower arm, via the bottom end, after combining with the lower end, continues laterally, forwards until it intersects a curvilinear, concave, interior surface of the discontinuous annular flat member.

An upper circular through slot and a lower circular through slot, both located in and being concentric with the discontinuous annular flat member, traverse zones of the latter, respectively a top zone and a bottom zone.

An upwardly directed arrow mark engraved immediately above the upper circular through slot and centered on the vertical diameter that passes through the center of symmetry of the discontinuous annular flat member. Angle-indicating, equidistantly engraved marks incrementally extend at the left and right of the upwardly directed arrow mark, being preceded by an engraved inscription "HIP OR VALLEY". The upwardly directed arrow mark, the angle-indicating, equidistantly engraved marks and the previously mentioned inscription being all disposed on an arc of a circle.

A zero mark, engraved as "0", coincides vertically with the upwardly directed arrow mark and is flanked, at left and right up to 90°, by a series of engraved, angle-indicating marks. The series of engraved, angle-indicating marks, at the left, is preceded by an engraved inscription "ROOF PITCH". The zero mark, engraved as "0" and the series of equidistantly engraved, angle-indicating marks are all disposed on an arc of a circle adjacent to external periphery of the discontinuous annular flat member.

The engraved mark 90 coinciding with the vertical diameter of the discontinuous annular flat member, is disposed above and in contact with the lower circular through slot, in proximity of internal periphery of the discontinuous annular flat member. The first series of decremental marks, equidistantly engraved, adjacent to an external periphery of the discontinuous annular flat member, extends upwardly from a 90 engraved mark, being collinear with the engraved mark 90, up to a "0" (zero) mark, while a second series of decremental marks; equidistantly engraved, adjacent to the external periphery of the discontinuous annular flat member, extends downwards from the 90 engraved mark, above mentioned, up to a mark 60.

A bracket, perpendicular to the longitudinal axis of symmetry of the flat, inverted at 90 degrees U-shape elongated frame, is placed in an interior of the discontinuous annular flat member, close, at the left, to the internal periphery of the latter, and is delimited vertically, at its upper part, by the narrow strip and at its lower part by the interior of the discontinuous annular flat member. A web, which is a mirror image of the bracket, is situated at the farthest right extremity of the inverted at 90 degrees U-shape elongated frame;

The bracket and the web incorporate, at their ends, a pair of elongated through-passage openings provided with chamfered edges. The bracket and the web have their underside retracted from the second bottom face;

A rigidity wall, retracted from the first upside face, encompasses the flat, inverted at 90 degrees U-shape elongated frame which is located in the interior of the discontinuous annular flat member. A pair of stiffening ribs joining the interior of the discontinuous annular flat member with the flat, inverted at 90 degrees U-shape elongated frame, respectively via the bracket and the narrow strip, coincide directionally, one of the pair of stiffening ribs—with vertical diameter and the other one of the pair of stiffening ribs with horizontal diameter of the discontinuous annular flat member. The pair of stiffening ribs protrudes from the rigidity wall and extend upwards up to the first upside face;

A pair of angle beams, each one of the pair of angle beams being provided with unequal legs, one vertical leg and the other-horizontal leg. The vertical leg is provided with flat ends at both extremities. The vertical leg of one of the pair of angle beams is so positioned as to face another vertical leg of the other of the pair of angle beams. Each flat end is provided with a threaded opening. Screws with countersunk heads are inserted via the pair of elongated and spaced through-passage openings, located at the extremities of the bracket and of the web and provided with chamfered edges and, then, tightened into the threaded openings, distances between the vertical legs being adjustable so that the pair of angle beams is adaptable to receive various circular saws with various bases. A thickness of the pair of angle beams is so chosen that the latter does not protrude beyond the second bottom face;

The second bottom face of the monobloc structural unit is formed by a flat surface interrupted by a rectangular opening delimited by internal edges of the bracket and the web, by internal edges of the upper arm and of the narrow strip, detached from the upper arm, and by internal edge of the lower arm which via the bottom end, after interconnecting the lower end, continues laterally and forwards until it intersects a curvilinear, concave, interior surface of the discontinuous annular flat member. The flat surface is interrupted by a ring type channel having a U-shape cross section. The ring type channel extends outside, at a relative short distance from of the upper circular through slot and the lower circular through slot. An internal edge of the ring type channel is coplanar with the second bottom face, while an external edge of the ring type channel is somewhat retracted with respect to the internal edge. The external edge extends outwardly into an external ring with which is coplanar;

The external ring extends backwardly, at both external margins of the upper arm and the lower arm, by elongated strips, both coplanar with the external ring;

The fence subassembly, which is interconnected and cooperates with the first and second subassemblies that constitute a monobloc structural unit, comprises an annular flat segment provided on its top side with planar circular zones projecting beyond the annular flat segment and shaped and sized for engaging the ring type channel and, respectively, the external ring. A first hollow bar, having a rectangular cross-section and extending from both sides of a right extremity of annular flat segment, is so attached to the annular flat segment that their upper surfaces are coplanar. An internal end of the first hollow bar, at the right, is so cut off that an obtuse angle is formed. A second hollow bar, having, as well, the previously mentioned rectangular cross-section and extending from both sides of a left extremity of the annular segment is so attached to the annular flat segment that their upper surfaces are coplanar. An internal end of the second hollow bar being so cut off, at the left, that an acute angle is formed. A pair of screws securely attached vertically to the annular flat segment is so spaced as to penetrate through the upper circular through slot and the lower circular through slot: A pair of threaded coupling pieces together with the pair of screws are used to positionally secure the fence subassembly to the first and second subassemblies. First hollow bar is provided outside the annular flat segment, at the left, with a plurality of indicating marks extending from "9" to "20".

II. BRIEF DESCRIPTION OF THE DRAWINGS

The invention is illustrated by the accompanying drawings in which.

III. DESCRIPTION OF THE PREFERRED EMBODIMENT

Figure 1:
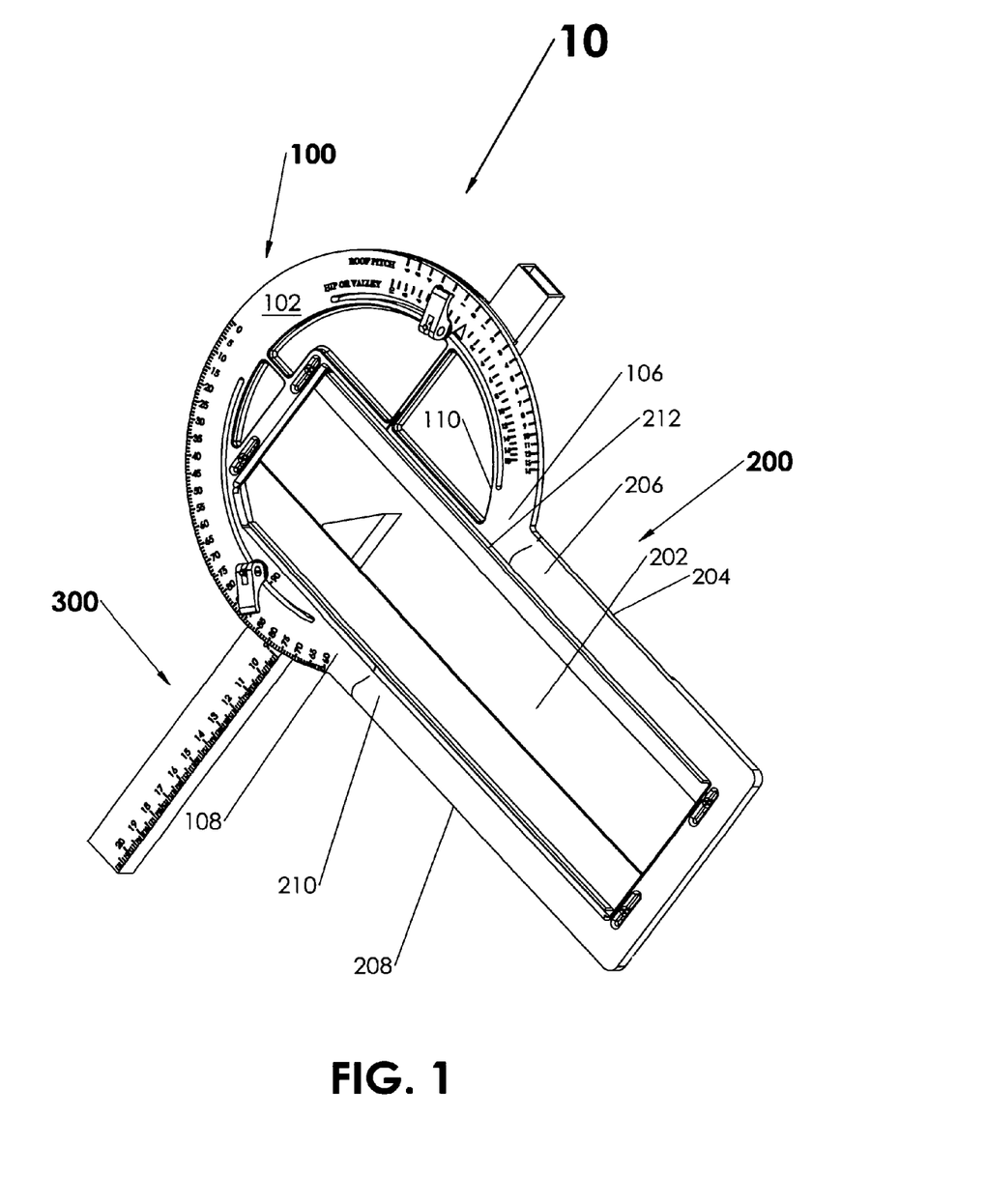
FIG. 1 is a perspective view of the guidance assembly.
Figure 1A:
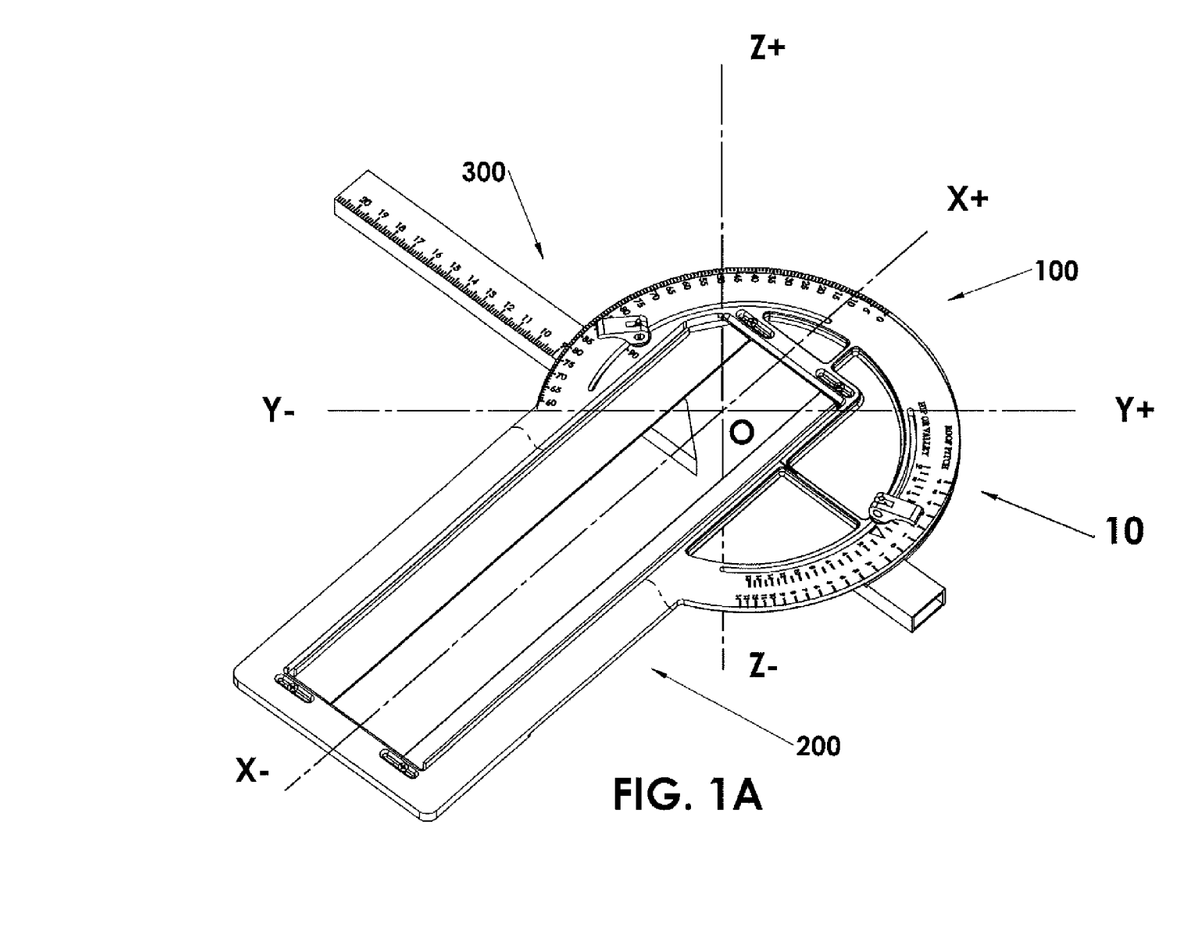
FIG. 1A is a diagrammatic view of the guidance assembly of FIG. 1, combined with a 3-D coordinate system ($x^+$-$x^-$, $y^+$-$y^-$, $z^+$-$z^-$), having an origin "o" and serving as a frame of reference for the drawings, is depicted.
Figures 2, 2A, 2B:
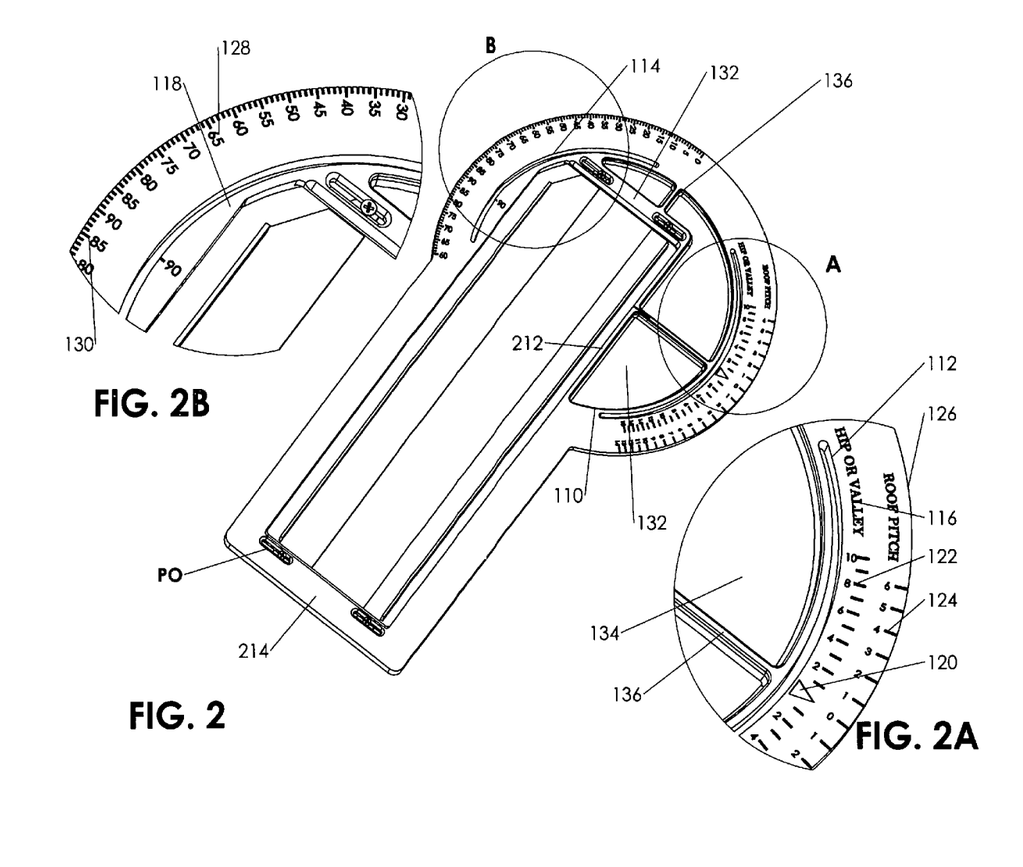
FIG. 2 is a top view of the first and second subassemblies which form a monobloc structural unit.
FIG. 2A is an enlarged partial view of a zone A of FIG. 2.
FIG. 2B is an enlarged partial view of a zone B of FIG. 2.
Figure 3:
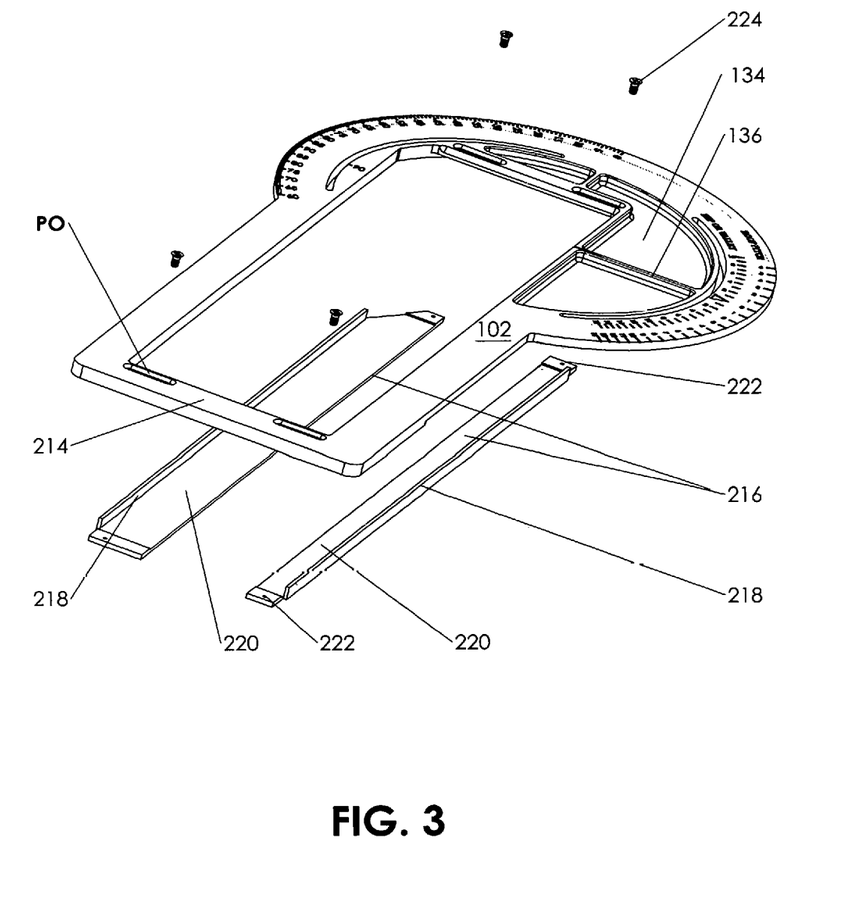
FIG. 3 is an exploded view of the monobloc structural unit depicted in FIG. 2.
Figures 4, 5:
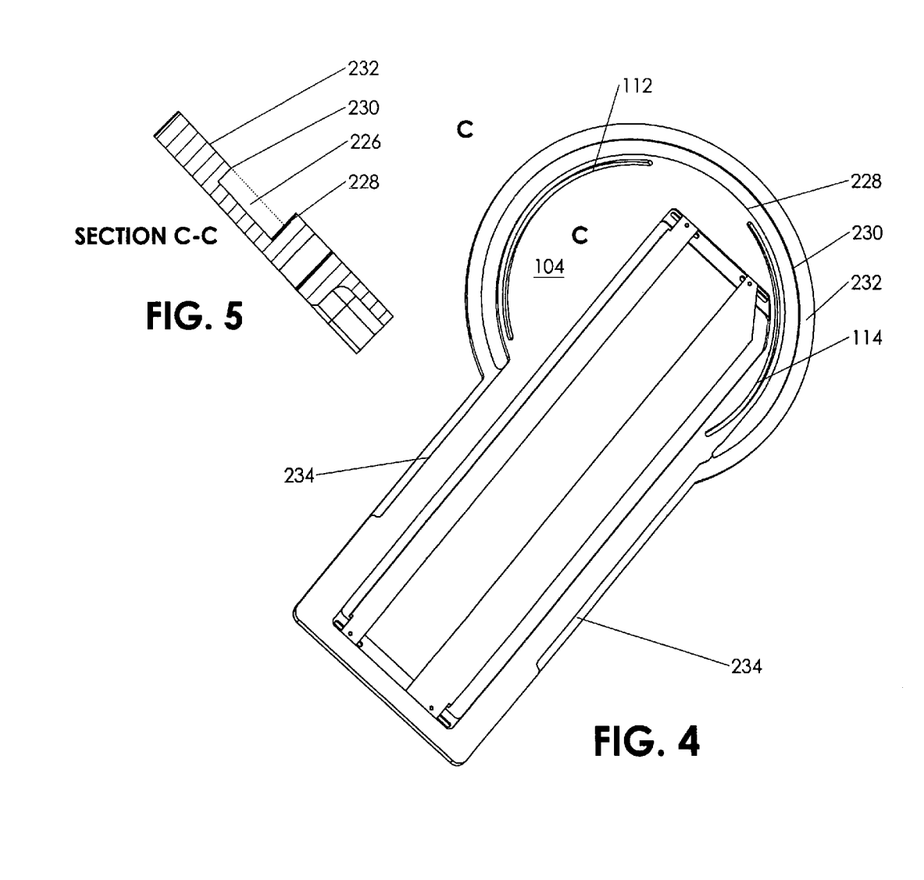
FIG. 4 is a back view of the monoblock structural unit shown in FIGS. 2 and 3.
FIG. 5 is a cross-section of FIG. 4, along line C-C.
Figures 6, 6A:
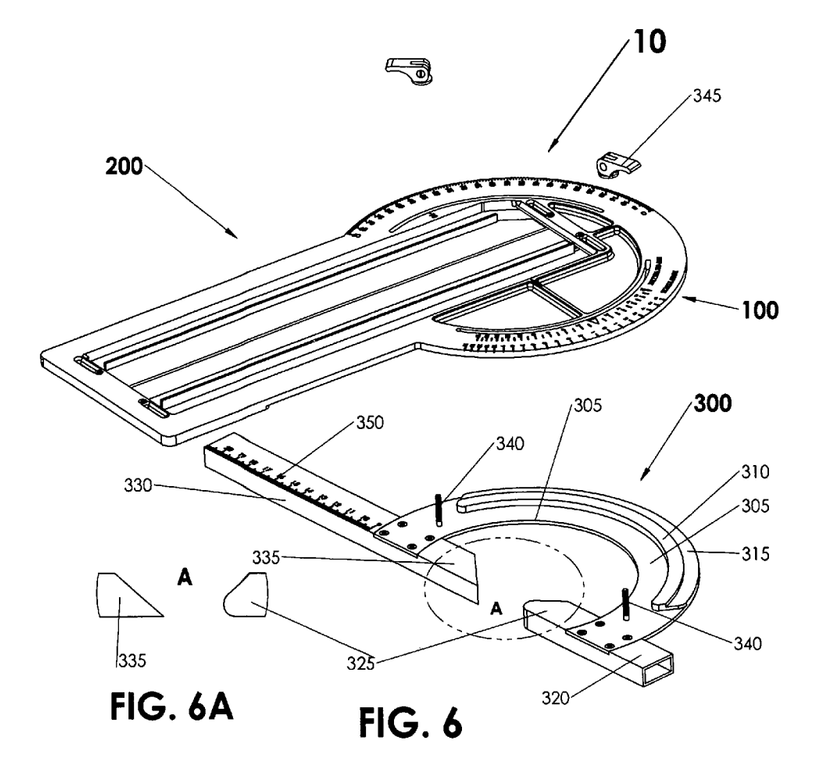
FIG. 6 is an exploded view of the guidance assembly.
FIG. 6A illustrates internal ends of the first and second hollow bars of the fence subassembly.
Figure 7:
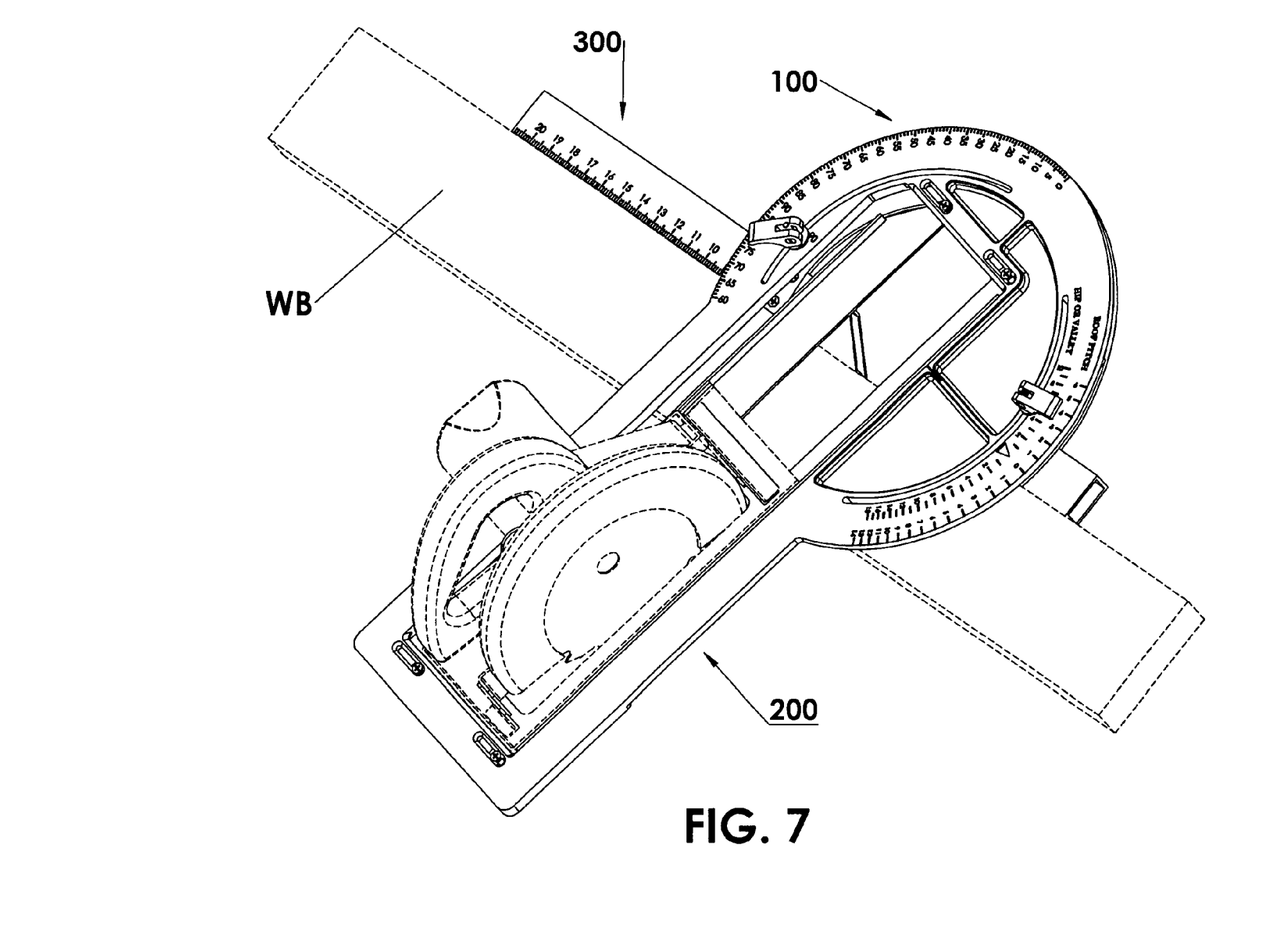
FIG. 7 is a perspective view of the guidance assembly, ready for use.

The accompanying drawings, as above described, illustrate a preferred embodiment of a guidance assembly for circular saws.

This preferred assembly is generally designated with numeral 10. For convenience, in the following disclosure the guidance assembly for circular saws will be named "guidance assembly 10".

As a caveat, before an embodiment of the present invention is explained in detail, it is to be understood that the invention is not limited in its application to the structural details and the arrangements of the components set forth in the following description and illustrated in the accompanying drawings. The invention is applicable to other embodiments and of being practiced or of being carried out in various variants. Also, it to be understood that the terms used herein with reference to the orientation of the "guidance assembly 10" (such as, for example, terms like "front", "back", "upper", "lower", "horizontal", "vertical", "forward", "backward" and the like), are only used to better understand the description of the present invention with reference to its usual, horizontal position of use.

Guidance assembly 10 comprises, a monobloc structural unit, which, in order to facilitate the description and understanding of its structure, is conveniently divided in the following two subassemblies that in, reality, compound in one integral, unitary body:

a first, discontinuous annular flat, subassembly 100, further named "first subassembly 100", defined by a center of symmetry (not shown), having a first face 102 delimiting its upside and a second face 104 delimiting its bottom and terminating laterally and backwards in an upper end 106 and in a lower end 108;

a second, flat inverted at 90 degrees U-shape elongated frame subassembly 200, further named "second subassembly 200", extending frontwards, towards first subassembly 100 and, defined by a horizontal, longitudinal axis of symmetry 202, includes an upper arm 204 ending in a top end 206 and a lower arm 208 ending in a bottom end 210; upper end 106 interpenetrating with top end 206 and lower end 108 interpenetrating with bottom end 210, thus forming the monobloc structural unit, mentioned above;

other the fact, that upper arm 204, respectively its top end 206, basically interconnects with upper end 106 along their widths, a narrow strip 212, detached from upper arm 204, extends beneath it, horizontally and forwards into the interior of first subassembly 100;

the center of symmetry of first subassembly 100, being displaced vertically and downwards with respect to horizontal, longitudinal axis of symmetry 202, a positional eccentricity is created; lower arm 208, via its bottom end 210, after combining with lower end 108, continues laterally, forwards until it intersects a curvilinear, concave, interior surface 110 of first subassembly 100; an upper circular through slot 112 and a lower circular through slot 114, both located in and concentric with first subassembly 100 traverse zones of the latter, respectively a top zone 116 and a bottom zone 118;

an upwardly directed arrow mark 120 is engraved, immediately above upper circular through slot 112 and is centered on the vertical diameter that passes through the center of symmetry of first subassembly 100; angle-indicating, equidistantly engraved marks 122 incrementally extend at the left and right of upwardly directed arrow mark 120, are preceded by an engraved inscription "HIP OR VALLEY"; upwardly directed arrow mark 120, angle-indicating, equidistantly engraved marks 122 and the previously mentioned inscription are all disposed on an arc of a circle;

a zero mark, engraved as "0", coincides linearly with upwardly directed arrow mark 120 and is flanked, at left and right up to 90°, by series of engraved, angle-indicating marks 124; the series of engraved, angle-indicating marks 124, at the left, is preceded by an engraved inscription "ROOF PITCH"; the zero mark, engraved as "0" and the series of equidistantly engraved, angle-indicating marks 124 are all disposed on an arc of a circle adjacent to external periphery 126 of first assembly 100;

an engraved mark "90" coinciding with vertical diameter of first assembly 100 is disposed above and in contact with lower circular through slot 114, in proximity of internal periphery of first subassembly 100; a first series of decremental marks 128 equidistantly engraved, adjacent to external periphery 126 of first subassembly 100, extends upwardly from a "90" engraved mark, collinear with previously mentioned engraved mark "90", up to a "0" (zero) mark, while a second series of decremental marks 130, equidistantly engraved, adjacent to external periphery 126 of first subassembly 100, extends downwards from "90" engraved mark, above mentioned, up to a mark "60";

a bracket 132, perpendicular to longitudinal axis of symmetry 202 of second subassembly 200, is located in the interior of first subassembly 100, close, at the left, to the internal periphery of the latter, and is delimited vertically, at its upper part, by narrow strip 212 and at its lower part by the interior of first subassembly 100;

a farthest right extremity of second subassembly 200 incorporates a zone 214, oppositely located and functionally equivalent to bracket 132; bracket 132 and zone 214 include, at their ends, a pair of elongated through-passage openings PO provided with chamfered edges; bracket 132 and zone 214 have their underside retracted from second face 104;

a rigidity wall 134, retracted from first face 102, encompasses that portion of second subassembly 200 which is located in the interior of first subassembly 100; a pair of stiffening ribs 136 joining the interior of first subassembly 100 with second subassembly 200, respectively via bracket 132 and narrow strip 212, coincide directionally, one of the pair with vertical diameter and the other one with horizontal diameter of first subassembly 100; the pair of stiffening ribs 136 protrudes from rigidity wall 134 and extends upwards up to first face 102;

a pair of angle beams 216, wherein each one of the pair of angle beams 216 is provided with unequal legs, one vertical leg 218 and one horizontal leg 220, vertical leg 218 being interrupted at both extremities; vertical leg 218 of one of the pair of angle beams 216 is so positioned as to face an opposite vertical leg 218 of the other of the pair of angle beam 216; both ends of each horizontal leg 220 is provided with threaded opening 222; screws with countersunk heads 224 are inserted via the pair of elongated and spaced through-passage openings PO at the extremities of bracket 132 and of zone 214 and then tightened into threaded openings 222; distances between opposite vertical legs 218 are adjustable so the pair of angle beams 216 is adaptable to receive various bases of circular saws; a thickness of the pair of angle beams 216 is so chosen that the latter does not protrude beyond second face 104;

second face 104 consists essentially of a flat surface having a rectangular opening delimited by interior edges of bracket 132 and zone 214, by internal edges of upper arm 204 and of narrow strip 212 and by the internal edge of lower arm 208 which via its bottom end 210, after interconnecting lower end 108, continues laterally, forwards until it intersects curvilinear, concave, interior surface of first subassembly 100; flat surface includes a ring type channel 226 having a U-shape cross section; ring type channel 226 extends outside, at a relative short distance of upper circular through slot 112 and lower circular through slot 114; an internal edge 228 of ring type channel 226 is coplanar with second face 104, while an external edge 230 of ring type channel 226 is somewhat retracted with respect to internal edge 228; external edge 230 extends outwardly into an external ring 232 with which is coplanar;

external ring 232 extends backwardly, at both external margins of upper arm 204 and lower arm 208, by elongated strips 234, both coplanar with external ring 232;

guidance assembly 10 further comprises:
  a fence subassembly 300, which is interconnected and cooperates with first and second subassemblies 100 and 200 that constitute a monobloc structural unit, comprises an annular flat segment 305 provided on its top side with planar circular zones 310 and 315 projecting beyond annular flat segment 305 and shaped and sized for engaging ring type channel 224 and, respectively, external ring 232; a first hollow bar 320, having a rectangular cross-section and extending from both sides of a right extremity of annular flat segment 305, is so attached to annular flat segment 305 that their upper surfaces are coplanar; an internal end 325 of first hollow bar 320 is backwardly cut off that an obtuse angle is formed; a second hollow bar 330, having, as well, the previously mentioned rectangular cross-section and extending from both sides of a left extremity of annular segment 305 is so attached to annular flat segment 305 that their upper surfaces are coplanar, an internal end 335 of second hollow bar 330 is forwards cut off that an acute angle is formed; a pair of screws 340 securely attached vertically to annular flat segment 305 is so spaced as to penetrate through upper circular through slot 112 and lower circular through slot 114; a pair of threaded coupling pieces 345 together with the pair of screws 340 are used to positionally secure fence subassembly 300 to subassemblies 100 and 200; second hollow bar 330 is provided outside annular flat segment 305, at the left with a plurality of marks 350 extending from "9" to "20"

Use of the "Guidance Assembly for Circular Saws"

The operational steps are:

Placing a wooden board WB under first and second subassemblies 100 and 200, so that, laterally, is positioned against first and second hollow bars 320 and 330 offence subassembly 300;

Matching the blade angle of a circular saw to the angle you need to cut, by rotating subassemblies 100 and 200 relatively to fence subassembly 300;

Tightening the pair of threaded coupling pieces 345;

Adjusting the distance between the pair of angle beams 216 as to accommodate a base of a circular saw;

Securing the pair of angle beams 216; and Turning on the saw power and, then, translating the circular saw along the pair the angle beams 216.

What I claim is:

1. A guidance assembly for circular saws, defined by reference to a 3-D coordinate system using axes $x^+$-$x^-$; $y^+$-$y^-$; and $z^+$-$z^-$ and an origin "o", comprising a monobloc structural unit, which incorporates a first and a second subassembly and is interconnected with a fence subassembly and cooperates with said fence subassembly, said first subassembly comprises:

a discontinuous annular flat member having a center of symmetry, a first upside face, coplanar with a plane formed by said axes $x^+$-$x^-$ and $y^+$-$y^-$, a second bottom face parallel to and spaced from said first upside face and having a negative coordinate on said axis o-$z^-$; said discontinuous annular flat member extending at a right side and a left side of the axis $x^+$-$x^-$, into a first right end and a first left end, both said first right end and said first left end being parallel to the axis $x^+$-$x^-$ and having a direction parallel to an axis o-$x^+$;

said second subassembly comprises:

a flat, U-shape elongated frame extending towards said discontinuous annular flat member, is defined by a horizontal, longitudinal axis of symmetry coinciding with said the axis $x^+$-$x^-$ and including a right arm, situated at the right of said horizontal, longitudinal axis of symmetry and ending in a second right end, and a left arm, situated at the left of said horizontal, longitudinal axis of symmetry and ending in a second left end; said first right end interpenetrating with said second right end and said first left end interpenetrating with said second left end, thus forming said monobloc structural unit;

a narrow strip, detached from said right arm, extends in parallel and at the right of said horizontal, longitudinal axis of symmetry into an interior of said discontinuous annular flat member;

said center of symmetry of said discontinuous annular flat member is situated at the right of said horizontal, longitudinal axis of symmetry where said origin "o" is located, so that a positional eccentricity is created;

said left arm, via said second left end, after combining with said first left end, continues laterally, forwards and intersects a curvilinear, concave, interior surface of said discontinuous annular flat member; a right, circular through slot situated at the right of the axis $x^+$-$x^-$ and a left circular through slot situated at the left of the axis $x^+$-$x^-$, said right, circular through slot and said left, circular through slot are located in and concentric with said discontinuous annular flat member traverse from zones of said discontinuous annular flat member, namely a right zone and a left zone;

a rightward directed arrow mark engraved at the right of said right, circular through slot, first angle-indicating, engraved marks, extending at both sides of said rightward directed arrow mark, are preceded by an engraved inscription "HIP OR VALLEY"; said rightward directed arrow mark, said first angle-indicating, engraved marks and said engraved inscription "HIP OR VALLEY" all disposed on a first arc of a first circle;

a zero mark, engraved as "0", situated on an extension of a line starting from the center of symmetry of said discontinuous annular flat member and passing through said rightward directed arrow mark is flanked by second angle-indicating, engraved marks; said second angle-indicating, engraved marks being preceded by an engraved inscription "ROOF PITCH"; said zero mark, engraved as "0" and said second angle-indicating, engraved marks being all disposed on a second arc of a second circle next to an external periphery of said discontinuous annular flat member;

a first engraved mark "90" situated on a line that passes through said zero mark, engraved as "0", through said rightward directed arrow mark and through said center of symmetry of said discontinuous annular flat member, being disposed at the left of said left circular through slot, in proximity of an internal periphery of said discontinuous annular flat member; a first series of decremental marks, equidistantly engraved, adjacent said external periphery of said discontinuous annular flat member, extending at one side of a second engraved mark "90", collinear with said first engraved mark "90", up to a "0" (zero) mark, while a second series of decremental marks, equidinstantly engraved, next to said external periphery of said discontinuous annular flat member, extending at another side of said second engraved mark "90", up to a mark "60";

a bracket, perpendicular to said longitudinal axis of symmetry of said flat, U-shape elongate frame being placed in said interior of said discontinuous annular flat member, close, at the left, to said internal periphery of said discontinuous annular flat member and is delimited at the right by said narrow strip and at the left by said interior of said discontinuous annular flat member;

a web, opposite said bracket, situated, at the farthest extremity of said flat, U-shape elongated frame said bracket and said web each incorporating a pair of elongated through-passage opening provided with chamfered edges; said bracket and said web having their undersides retracted from said second bottom face;

a rigidity wall, retracted from said first upside face, incorporating said flat, U-shape elongated, being located in said interior of said discontinuous elongated frame annular flat member;

a pair of stiffening ribs joining said interior of said discontinuous annular flat member with said flat, U-shape elongated frame, one of said pair of stiffening ribs coinciding directionally with a line perpendicular to the axis $x^+$-$x^-$ and the other one of said pair of stiffening ribs coinciding directionally with a line parallel to the axis $x^+$-$x^-$; said pair of stiffening ribs protruding from said rigidity wall and extending upwardly up to said first upside face;

a pair of angle beams, each one of said pair of angle beams being provided with a first leg perpendicular to the plane formed by the axes $x^+$-$x^-$ and $y^+$-$y^-$ and second leg parallel to the plane formed by the axes $x^+$-$x^-$ and $y^+$-$y^-$, said first leg of one of said pair of angle beams being so positioned as to face another said first leg of another one of said pair of angle beams; each said second leg being provided at both extremities with a threaded opening; a first screw with a countersunk head through each one of said pair of elongated through-passage openings and tightened into each said-flat-end said threaded opening; distances between said first legs chosen so that said pair of angle beams is adaptable to receive various circular saws with various bases; an extent of said pair of angle beams is so chosen that said pair of angle beams does not protrude beyond said second bottom face of said monobloc structural unit;

said second bottom surface of said monoblock structural unit comprising a flat surface incorporating a rectangular opening delimited by internal edges of said bracket and said web, by internal edges of said right arm and of said narrow strip, said narrow strip being detached from said right arm, and by an internal edge of said left arm which via said second left end, after interconnecting said first left end, continues until said second bottom face intersects the curvilinear, concave, interior surface of said discontinuous annular flat member; said flat surface incorporating as well a channel having an U-shape cross-section; said channel having an U-shape cross-section extending near said right circular through slot and said left circular through slot; an internal edge of said channel having an U-shape cross-section being coplanar with said second bottom face, while an external edge of said channel having an U-shape cross-section is located near said internal edge; said external edge extending outwardly into an external ring with which said external edge extending outwardly into an external ring is coplanar;

said external ring continuing as a first elongated strip extending from a first external margin of said right arm and as a second elongated strip extending from a second external margin of said left arm; said first and second elongated strips being coplanar with said external ring;

said fence subassembly, which is interconnected and cooperates with said first and second subassemblies that constitute said monobloc structural unit, comprising an annular flat segment having a top side with planar circular zones projecting above said annular flat segment and configured for engaging said channel having an U-shape cross-section and said external ring; a first hollow bar, having a rectangular cross-section and extending from both sides of a right extremity of said annular flat segment, is so attached to said annular flat segment that an upper surface of said annular flat segment and an upper surface of said first hollow bar are coplanar, an internal end of said first hollow bar being so cut off that an obtuse angle is formed; a second hollow bar, having a rectangular cross-section and extending from both sides of a left extremity of said annular segment, is so attached to said annular flat segment that said upper surface of said annular flat segment and an upper surface of said second hollow bar are coplanar; an internal end of said second bar being so cut off that an acute angle is formed; a pair of second screws securely attached to said annular flat segment being so spaced as to penetrate through said right circular through slot; a pair of threaded coupling pieces together with said pair of second screws being used to positionally secure said fence subassembly to said first and second subassemblies; said first hollow bar being provided outside said annular flat segment, at the left, with a plurality of indicating marks extending from "9" to "20".

* * * * *